United States Patent Office 3,450,744
Patented June 17, 1969

3,450,744
DICARBAMATE DERIVATIVES OF ALKYLADAMANTANES
Robert E. Moore, Wilmington, Del., assignor to Sun Oil Company, Philadelphia, Pa., a corporation of New Jersey
No Drawing. Filed Apr. 25, 1967, Ser. No. 633,361
Int. Cl. C07c 69/74
U.S. Cl. 260—468                               7 Claims

ABSTRACT OF THE DISCLOSURE

Diesters of 5,7-dialkyladamantane-1,3-dicarbamic acid are disclosed. These compounds exhibit antiviral activity against tobacco mosaic virus and against several viruses including Columbia SK polio in virology tests with mice.

BACKGROUND OF THE INVENTION

This invention relates to alkyl diesters of dicarbamic acids derived from certain alkyladamantanes. These dicarbamates have each carbamate group attached to the adamantane nucleus at a bridgehead position. More specifically they are dialkyl esters of 5,7-dialkyladamantane-1,3-dicarbamic acid.

The cage-like structure of the adamantane nucleus has been illustrated in several ways, of which the following is one example:

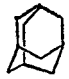

As can be seen, it consists of three condensed cyclohexane rings arranged so that there are four bridgehead carbon atoms which are equivalent to each other.

In the prior art Stetter et al., Chem. Ber., 95, 2302–2304 (1962) have described the preparation of the methyl ester of 1-adamantane carbamic acid, therein designated as N-[adamantyl-(1)]-methylurethan. The preparation involved the Hofmann rearrangement wherein the corresponding adamantyl amide was reacted with bromine and aqueous sodium hydroxide to give 1-isocyanato-adamantane which was separated by filtration. This isocyanate was then reacted with methanol in the presence of sodium hydroxide as catalyst to yield the methylcarbamate ester. Stetter et al., Chem. Ber. 93, 226–230 (1960) also showed the preparation of this compound by direct conversion of the adamantyl amide to the carbamate utilizing methanol, sodium and bromine as reagents.

U.S. Patent No. 3,203,970 shows the preparation or adamantane isocyanate and mentions that it can be converted to the corresponding carbamic acid ester by reaction with alcohol in the presence of pyridine.

Adamantane derivatives having two carbamate groups attached to the adamantane nucleus do not appear to have been disclosed heretofore.

SUMMARY OF THE INVENTION

The alkyladamantane dicarbamates provided by the present invention have the structure

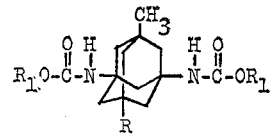

wherein R is methyl or ethyl and $R_1$ is an alkyl group of the $C_1$–$C_8$ range. In preferred compounds of the class defined $R_1$ is an alkyl group of the $C_1$–$C_3$ range. These compounds exhibit antiviral activity both in plant tests against tobacco mosaic virus and in tests with mice against several viruses.

DESCRIPTION

The dicarbamate compounds of the invention can be prepared from the corresponding hydrocarbons, i.e., from 1,3-dimethyladamantane or 1-methyl-3-ethyladamantane, by first converting the hydrocarbon to a bridgehead diamide and then reacting the latter by any of the prior art procedures referred to above.

Another route for preparing the present dicarbamates involves conversion of the parent hydrocarbon to the 1,3-diamine and reaction of the latter with phosgene to form the corresponding 1,3-diisocyanate. Such procedure for making 1,3-diisocyanato-5,7-dialkyladamantanes is described in my copending U.S. application Ser. No. 587,948, filed Oct. 20, 1966. This type of reaction for converting diamines to diisocyanates is well known and is described, for example, in Bulletin HR-2, Jan. 20, 1956, of Du Pont Elastomer Chemicals Department and references cited therein. After the 1,3-diisocyanate has been prepared, it is converted to the desired dicarbamate by reaction with a $C_1$–$C_8$ alcohol, more preferably a $C_1$–$C_3$ alcohol, utilizing either an acid or base as catalyst. The particular alcohol used determines what the two $R_1$ groups in the ester product are. Either primary, secondary or tertiary alcohols can be used in this reaction and the resulting $R_1$ groups in the ester product will correspondingly be primary, secondary or tertiary.

As a specific illustration, the conversion of 1-methyl-3-ethyladamantane to the dibridgehead dicarbamic acid dimethyl ester is considered. The starting hydrocarbon can be converted to the 1,3-dinitro derivative and the latter reduced to 1,3-diamino-5-methyl-7-ethyladamantane, as disclosed in U.S. Patent No. 3,258,498. The resulting diamine, in the form of a slurry in o-dichlorobenzene, is treated with phosgene while the mixture is refluxed to give the diisocyanate according to the following reaction:

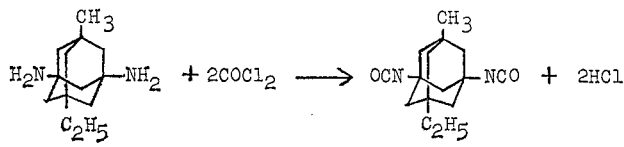

The 1,3-diisocyanate is recovered and then converted to the dimethyl ester of 5-methyl-7-ethyladamantane-1,3-dicarbamic acid. This can be done by admixing the diisocyanate with methanol and adding a small proportion of concentrated hydrochloric acid or dibutyl tin dichloride as catalyst. Reaction readily occurs at ordinary temperature in accordance with the following equation:

TABLE I

| Example No. | Ester alkyl group (R₁) | M.P., ° C. of dicarbamates obtained |
|---|---|---|
| 1 | CH₃ | 160 |
| 2 | C₂H₅ | 111 |
| 3 | n-C₃H₇ | 161 |
| 4 | i-C₃H₇ | ¹ 170–180 |
| 5 | n-C₄H₉ | 124 |
| 6 | n-C₈H₁₇ | 103 |

¹ Decomposed.

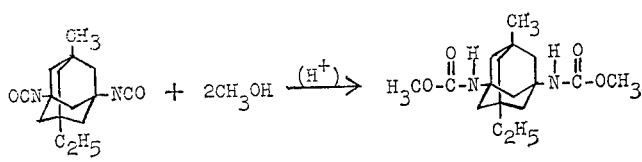

Preferably an excess of methanol is used to keep the reaction mixture from becoming solid and to insure completion of the reaction. The dicarbamate product is a white crystalline solid which can be recovered by chilling and filtering the mixture. The product can be purified by recrystallization from methanol or ethanol.

The dicarbamates of the class herein defined are white powders generally having melting points above 100° C. They are soluble in such solvents as ethers, acetone, lower alcohols, benzene, toluene, dimethylformamide and the like. As indicated above, they have unexpected antiviral activities both in plant tests and in animal tests. Specifically these compounds have inhibitory effects against tobacco mosaic virus which causes widespread damage to various crops, such as tobacco and tomato plants. In tests with mice the present compounds show activity as an antiviral agent particularly against Columbia SK polio virus and are capable of exerting inhibitory action against other viruses, e.g., herpes simplex virus.

In the following illustrative examples, the parent hydrocarbon corresponding to the diisocyanates used and to the dicarbamates obtained was 1,3-dimethyladamantane which, for convenience, is designated as "DMA."

EXAMPLE 1

Preparation of dimethyl diester of DMA dicarbamic acid

A mixture of 2.46 g. (0.01 mole) of 1,3-diisocyanato-DMA and 1.0 g. (0.031 mole) of methanol was warmed and a drop of concentrated hydrochloric acid was admixed therewith. An immediate exothermic reaction ensued and a white crystalline product began to appear. In a short time the exotherm subsided and the reaction was complete. The solid product was recovered from the mixture by filtration and was purified by recrystallization from ethanol. The yield was approximately 90% of theoretical. The melting point of the resulting DMA-1,3-dimethylcarbamate is given in Table I. Structure of the product was confirmed by IR and NMR spectra.

EXAMPLE 2–6

Preparation of other dialkyl diesters

Five other runs were made in approximately the same way as in Example 1 using other alcohols in place of methanol. Specifically the alcohols were these: ethanol; n-propanol; isopropanol; n-butyl; and n-octyl. In runs with the three last-named alcohols, dibutyl tin dichloride (0.01 g.) was used as catalyst in place of HCl. The reactions gave close to quantitative yields of the desired products. Their melting points also are shown in Table I.

EXAMPLE 7

Plant viricide tests

The DMA-1,3-dimethylcarbamate prepared as in Example 1 was tested as a viricide against tobacco mosaic virus using tobacco plants, *Nicotiana glutinosa,* grown from seeds under greenhouse conditions and in first true leaf growth stage. The diester compound was formulated for application to the plants by dissolving same in acetone and dispersing the mixture in water at a standard concentration. The tobacco plants first were sprayed with a standard amount of the aqueous mixture in a manner effecting complete covering of the plant surface and were air dried. An inoculum was prepared by extracting tobacco leaves infected with the virus and adding to the extract finely divided Carborundum. The treated dry plants were then inoculated by spraying the extract mixture thereon and rubbing leaf surfaces gently to assure epidermal cell rupture by the Carborundum. A set of control plants was inoculated in the same manner without prior treatment. The plants were thereafter observed for infection by the virus, the severity thereof being determined by actual count of infection loci, and such counts were compared for the treated plants as against the controls. It was found that the DMA-1,3-dimethylcarbamate provided 62% protection against infection by the tobacco mosaic virus. Other dicarbamates as here specified when used in this manner also exhibit antiviral activity against the tobacco mosaic virus.

EXAMPLE 8

Virology tests on mice using dimethyl ester of DMA dicarbamic acid

A series of in vivo virology tests with mice was made to test the DMA-1,3-dicarbamate of Example 1 (dimethyl ester) for antiviral activity against Columbia SK polio and herpes simplex viruses. These tests involved a comparison between mice treated with the compound in question and inoculated with the selected virus and a control group of untreated mice similarly inoculated. The quantity of virus used was that amount which would induce 50% mortality in the control animals within 21 days. The virus inoculum was introduced intraperitoneally. In some cases the route of drug administration was oral (PO), in others subcutaneous (SC) and in others intraperitoneal (IP), as indicated in Table I. Also, in some cases the drug was administered before inoculation only (PRE), in others only after inoculation (POST) and in still others both before and after inoculation (PRE and POST). Results of the tests were rated by means of an alphabetical scale having the following approximate meaning:

A.—Good activity, with an increased mean survival time of the treated mice.
B.—Less but statistically significant activity.
C.—No significant activity.

The results, which include some repeat tests made at different dates, are shown in Table II.

TABLE II

| Virus used | Route | Schedule | Total dosage, mg./kg. | Rating |
|---|---|---|---|---|
| Columbia SK polio | SC | PRE and POST | 0.15 | C |
| Do | SC | do | 0.3 | A |
| Do | SC | do | 1.5 | A |
| Do | SC | POST | 0.15 | C |
| Do | SC | do | 0.3 | C |
| Do | SC | do | 1.5 | C |
| Do | SC | PRE and POST | 0.3 | C |
| Do | IP | PRE | 0.1 | A |
| Do | IP | PRE | 1.0 | A |
| Do | SC | PRE and POST | 3.0 | A |
| Do | IP | PRE | 0.1 | C |
| Do | IP | PRE | 1.0 | C |
| Do | SC | PRE and POST | 0.3 | A |
| Do | SC | do | 3.0 | A |
| Herpes simplex | PO | POST | 0.04 | C |
| Do | PO | do | 0.4 | C |
| Do | PO | do | 4.0 | C |
| Do | SC | do | 0.03 | C |
| Do | SC | do | 0.3 | C |
| Do | SC | do | 3.0 | C |
| Do | SC | do | 3.0 | A |
| Do | SC | do | 0.3 | A |
| Do | SC | PRE and POST | 3.0 | C |
| Do | SC | do | 0.3 | C |
| Do | SC | POST | 0.03 | B |
| Do | SC | do | 0.03 | C |
| Do | SC | do | 3.0 | C |
| Do | SC | do | 0.3 | C |
| Do | SC | do | 3.0 | C |
| Do | SC | do | 0.3 | C |

The results in Table II indicate that the dimethyl ester can exert an inhibitory effect against Columbia SK polio virus in mice and prolong the lives of mice infected thereby. The results for the other virus indicate some degree of protection by this compound against the herpes simplex virus but less than in the case of Columbia SK polio virus. This dimethyl ester was also tested for activity against influenza NWS and vaccinia (IHD) viruses but no significant activity was found against these particular viruses (results not listed).

EXAMPLE 9

Virology tests on mice using di-n-propyl ester of DMA dicarbamic acid

Another series of virology tests with mice was carried out in the general manner described in Example 8 but using the di-n-propyl ester of Example 3. Tests with Columbia SK polio and influenza NWS viruses indicated positive antiviral activity as shown in Table III. Tests with herpes simplex virous, however, did not show any positive activity (results not listed).

TABLE III

| Virus used | Route | Schedule | Total dosage, mg./kg. | Rating |
|---|---|---|---|---|
| Columbia SK polio | SC | PRE and POST | 0.3 | C |
| Do | SC | do | 3.0 | A |
| Influenza NWS | SC | do | 0.3 | A |
| Do | SC | do | 3.0 | C |

The results of the tests of Examples 8 and 9 indicate that the dicarbamate compounds of the present invention can exhibit antiviral activity against several viruses in tests with mice. Dicarbamates of the group herein specified having $R_1$ groups other than methyl and n-propyl likewise can have inhibitory effects on various viruses in animal tests.

I claim:
1. A dicarbamate having the structure

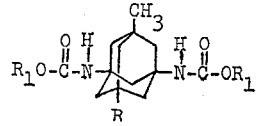

wherein R is methyl or ethyl and $R_1$ is an alkyl group of the $C_1$–$C_8$ range.

2. A dicarbamate according to claim 1 wherein R is methyl.

3. A dicarbamate according to claim 2 wherein $R_1$ is methyl or ethyl.

4. A dicarbamate according to claim 2 wherein $R_1$ is propyl or isopropyl.

5. A dicarbamate according to claim 1 wherein R is ethyl.

6. A dicarbamate according to claim 5 wherein $R_1$ is methyl or ethyl.

7. A dicarbamate according to claim 5 wherein $R_1$ is propyl or isopropyl.

References Cited

Prelog, V & Seiwerth, R., Deutsche Chemische Gesellschaft Berichte 74B 1769–72 (1941).
Smith, G. W. & Williams, H. D., J. Org. Chem. 26 2207–12 (1961).

LORRAINE A. WEINBERGER, Primary Examiner.
P. J. KILLOS, Assistant Examiner.

U.S. Cl. X.R.
424—299